United States Patent [19]

Edlund

[11] Patent Number: 5,660,065
[45] Date of Patent: Aug. 26, 1997

[54] PORTABLE COMPUTER LOCKING DEVICE

[75] Inventor: Jan Edlund, Linköping, Sweden

[73] Assignee: ICL Systems AB, Kista, Sweden

[21] Appl. No.: 182,069

[22] PCT Filed: Jun. 23, 1992

[86] PCT No.: PCT/SE92/00459

§ 371 Date: Jun. 14, 1994

§ 102(e) Date: Jun. 14, 1994

[87] PCT Pub. No.: WO93/01540

PCT Pub. Date: Jan. 21, 1993

[30] Foreign Application Priority Data

Jul. 5, 1991 [SE] Sweden ................. 9102103

[51] Int. Cl.$^6$ .................. E05B 69/00; H05K 5/00
[52] U.S. Cl. .................. 70/58; 361/685; 292/144; 340/825.31; 248/553
[58] Field of Search .................. 292/144; 70/57, 70/58, 275, 277–280, 266–268; 248/551–553, 222.3; 340/542, 543, 825.31; 361/685, 686, 172; 364/708.1; 312/223.2, 223.3; 395/325

[56] References Cited

U.S. PATENT DOCUMENTS

| | | | |
|---|---|---|---|
| 2,448,213 | 8/1948 | Doonan | 248/222.3 X |
| 2,765,648 | 10/1956 | Hatcher | 29/144 X |
| 2,786,701 | 3/1957 | Povlich | 292/144 |
| 2,826,388 | 3/1958 | Janos et al. | 248/222.3 X |
| 3,180,606 | 4/1965 | Sabin et al. | 248/222.3 X |
| 3,576,119 | 4/1971 | Harris | 292/144 X |
| 4,053,939 | 10/1977 | Nakauchi et al. | 292/144 X |
| 4,172,254 | 10/1979 | Vermillion | 340/542 X |
| 4,466,263 | 8/1984 | Rathmann | 70/277 X |
| 4,702,095 | 10/1987 | Ben-Asher | 70/279 |
| 4,727,369 | 2/1988 | Rode et al. | 70/278 X |
| 4,784,415 | 11/1988 | Malaval | 292/144 |
| 4,837,567 | 6/1989 | Kleefeldt et al. | 340/825.31 |
| 4,854,145 | 8/1989 | Arai et al. | 70/58 X |
| 4,855,720 | 8/1989 | Donovan | 248/553 X |
| 4,937,560 | 6/1990 | Nourmand | 340/542 |
| 4,985,695 | 1/1991 | Wilkinson et al. | 70/58 X |
| 5,041,924 | 8/1991 | Blackborow et al. | 361/685 X |
| 5,077,722 | 12/1991 | Geist et al. | 361/685 X |
| 5,122,914 | 6/1992 | Hanson | 361/685 X |
| 5,167,465 | 12/1992 | Inui et al. | 248/222.3 X |
| 5,224,018 | 6/1993 | Kobayashi | 292/170 X |
| 5,228,319 | 7/1993 | Holley et al. | 70/58 |
| 5,311,397 | 5/1994 | Harshberger et al. | 70/57 X |
| 5,313,596 | 5/1994 | Swindler et al. | 361/686 X |
| 5,323,291 | 6/1994 | Boyle et al. | 361/686 |
| 5,347,425 | 9/1994 | Herron et al. | 361/686 |
| 5,361,359 | 11/1994 | Tajalli et al. | 340/825.31 X |
| 5,389,919 | 2/1995 | Warren et al. | 235/382 X |

*Primary Examiner*—Suzanne Dino
*Attorney, Agent, or Firm*—Lee, Mann, Smith, McWilliams, Sweeney & Ohlson

[57] ABSTRACT

A device for readily locking and unlocking a lock mechanism which is intended to hold a computer firmly locked to a unit. The lock mechanism is electronically controllable. The computer is provided with an electrical outlet, which can be connected to the lock mechanism, and a program for controlling the lock mechanism. The lock mechanism is intended to automatically lock the computer firmly to the unit when the computer is placed in position and also to normally hold the computer locked to the unit.

18 Claims, 7 Drawing Sheets

PORTABLE COMPUTER LOCKING DEVICE

The present invention relates to an arrangement of the kind defined in the preamble of claim 1.

Computers have become smaller and easier to move from one place to another in recent years, which besides the obvious advantages afforded by this development has also created certain drawbacks. One drawback is that such computers and the information stored therein are more easily stolen, particularly in the case of portable computers.

One problem resulting from moving computers and installing them in different systems, is that the information stored therein must be kept updated in more than one place. This problem is illustrated by the following example:

An operator works during the day on writing a letter at his/her workplace. At the end of the day, there remains a deal to be done to the letter and the operator decides to continue with the work at home. In his/her working place, the operator is connected to a local network through a portable computer and the operator writes the letter on the central storage medium of the network (so-called file servers). It is now necessary for the operator to copy the latest version of the letter from the file server to the portable computer, switch-off the portable computer and disconnect the electrical connections. The operator now carries the computer home and finishes the letter. On the following morning, the operator connects the portable computer to the network at his/her workplace. The operator must now copy the revised version of the letter, from the portable computer to the file server of the network. Those copies made by the operator ensure that the information, in this case the letter, is held updated. The copies are difficult to make, the degree of difficulty depending on the extent of the copying. For instance, assume that instead of a letter, the work involves software modules which include program codes, and also assume that a number of these modules, although not all, have been changed and therewith need to be copied. Further assume that the program code is re-compiled, etc., updating in this case being a complex task and requiring a great deal of knowledge on the part of the person performing the work. The task becomes more complicated when the same information is found stored in three or more places. The aforedescribed example may, of course, be seen in a wider perspective. For instance the system to which the portable computer is coupled may have a different configuration, instead of using a file server in a network as a stationary storage medium, the storage medium of this network may have the form of a local hard disk, central computer storage medium, etc.

Locking devices which function to securely lock a computer are commercially available. These locking devices may, for instance, comprise a fitting mounted on the computer in combination with a padlock and cable. With this type of locking device, it is necessary for the operator to carry out certain steps manually when locking or unlocking the computer. This makes moving of the computer from one place to another more difficult and more complicated, which is a drawback, particularly in the case of portable computers. Furthermore, when using a padlock or some other type of key-operated lock or a combination lock, it is necessary to keep the key/combination in a safe place so that security is maintained. This places further demands on the operator and also detracts from the portability of the computer.

The main object of the invention is to provide a locking arrangement of the aforementioned kind which can be manipulated simply and reliably from the safety aspect.

Another object of the invention is to provide automatic updating in conjunction with moving the computer between different places.

The main object of the invention is achieved with an arrangement of the kind that has the characterizing features set forth in the characterizing clause of claim 1. Other features and further developments of the inventive arrangement are set forth in the remaining claims.

According to the present invention, there is provided an arrangement for locking a computer to a base or support element which is characterized in that the arrangement includes an electrically controllable locking mechanism and a computer-stored program for controlling the lock mechanism.

Because the lock-mechanism control program is stored in the computer, locking can be effected automatically when the computer is switched-on, subsequent to having been moved to an intended place. Activation of the lock mechanism is achieved very simply, solely by the operator giving a command.

The lock-mechanism control program may include a program code which enables the operator to update automatically and selectively when locking and/or unlocking the lock mechanism, thereby enabling the operator to ensure that updating has been effected when moving the computer from one place to another. By selective updating is meant that the operator is able to pre-select whether or not automatic updating shall take place and under which conditions updating shall be effected.

The lock-mechanism control program may also include a program code which enables the operator to set different parameters for updating and locking/unlocking, such as the insertion of a password when unlocking the mechanism, the extent of operator cooperation in automatic updating of the information, setting of the files/list of files to be included in the automatic updating process, etc.

According to one conceivable embodiment, the active part, i.e. the locking part, of the lock mechanism is incorporated in a unit which is particularly intended for electrically connecting and firmly locking a portable computer, wherein the establishment of electric connections is facilitated by virtue of providing the unit with electrical contacts for peripheral equipment, voltage and possibly mains connections (e.g. for connection to local networks, so-called LANs). This unit is hereinafter referred to as a security support. Alternatively, the active part of the lock mechanism can be incorporated in the unit in a computer system which normally includes a central processor, memory and hard disk or directly in a desk intended for computer use, etc.

So that the invention will be more readily understood and further features thereof made apparent, the invention will now be described in more detail with reference to exemplifying embodiments thereof and also with reference to the accompanying drawings, in which.

Figure 1:
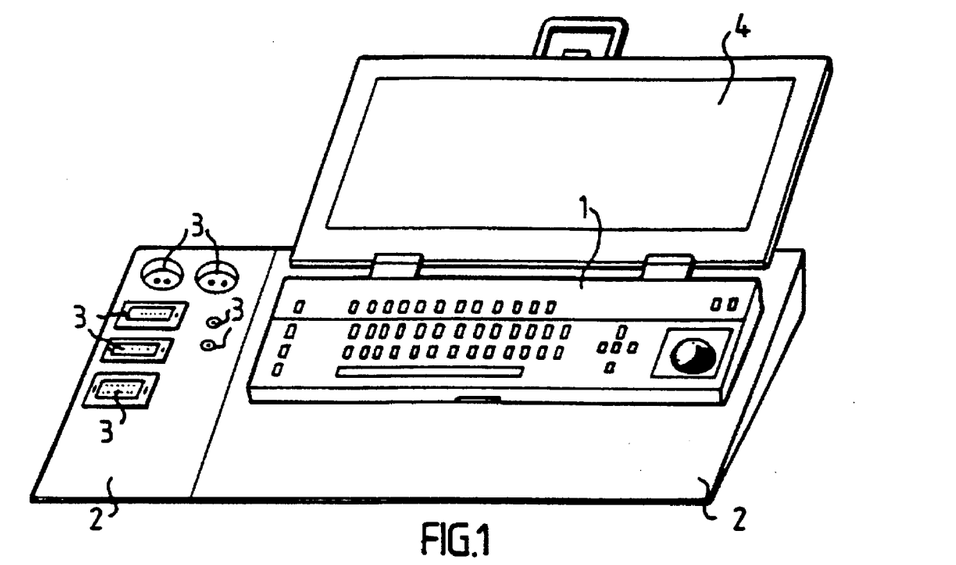
FIG. 1 illustrates schematically a portable computer locked firmly to a security support.

Shown in FIG. 1 is a portable computer 1 of arbitrary manufacture, said computer being connected to and locked to a security support element 2. The security support element 2 may include electrical contacts 3 for peripheral equipment, voltage and possibly network connections (e.g. for connection to local networks, so-called LANs). The illustrated computer 1 is equipped with an LCD-screen 4 (liquid crystal display).

Figure 2:
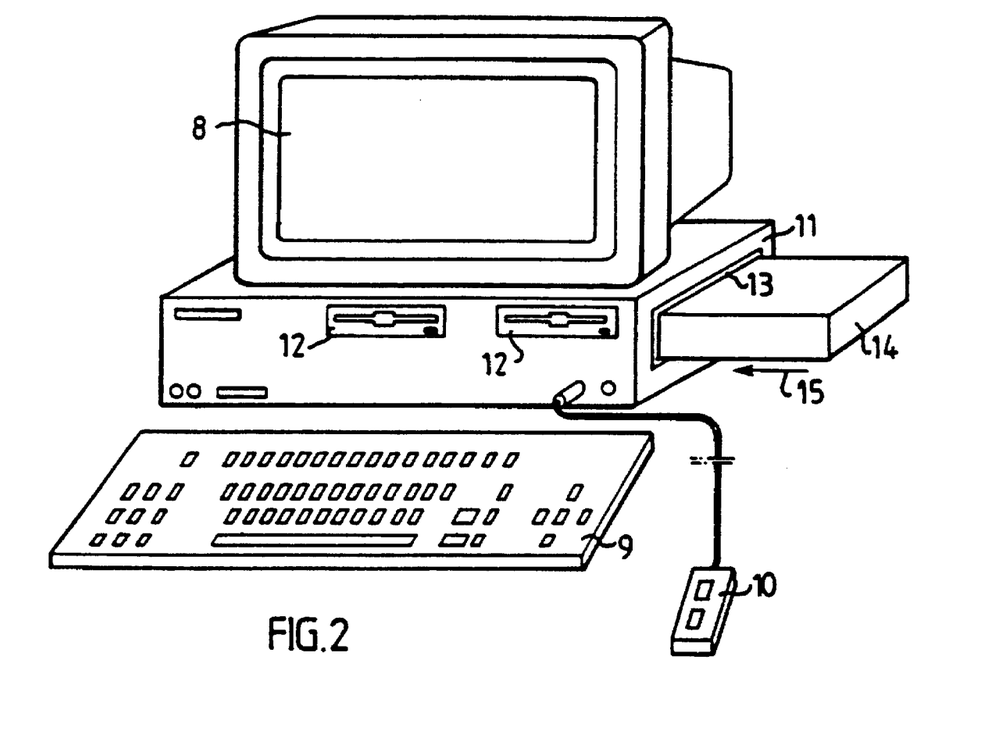
FIG. 2 illustrates schematically a computer system provided with a unit in which a portable computer can be placed and locked.

FIG. 2 illustrates a computer system which includes a display 8, a keyboard 9, a mouse 10 and a so-called expansion unit 11, which is equipped with two diskette stations 12. The expansion unit 11 has an insertion compartment 13 into which a portable computer 14 can be inserted and there firmly locked. The necessary electrical connections between the portable computer 14 and the expansion unit 11 are established automatically as a result of electrical connection contacts on the portable computer coacting with corresponding electrical contacts provided in the insertion compartment of the expansion unit, when the portable computer is pushed into the compartment in the direction of the arrow 15.

Alternatively, the active part of the lock mechanism can be housed in that unit of a computer system which normally includes central processor, memory and hard disk, or can be incorporated directly in a desk intended for computer use, etc. Of course, the computer can be locked firmly to any other type of object, this object being provided with the components that are necessary to lock the computer.

Irrespective of the object to which the portable computer is locked, it is advisable to ensure that the computer can only be connected in a voltageless state. In this regard, a mechanism which simply will not permit the portable computer to be connected when voltage is applied can be readily arranged. The mechanism may, for instance, include an electrically controlled arm which changes position when the voltage is switched on and off (not shown).

An embodiment of the inventive lock mechanism will now be described.

Figure 3A:
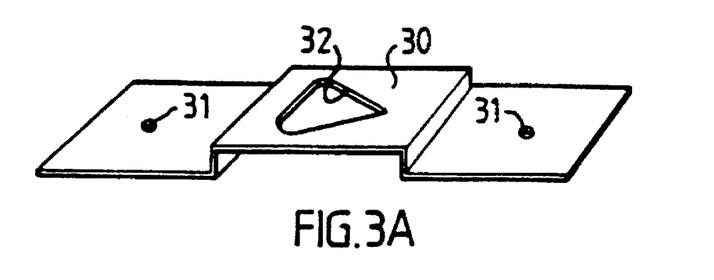
FIGS. 3A, 3B, 3C and 3D illustrate respectively a fitting and a lock plunger which are intended to form part of a lock mechanism constructed in accordance with one embodiment of the present invention.
Figure 3B:
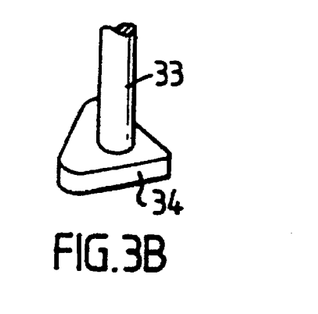
Figure 3C:
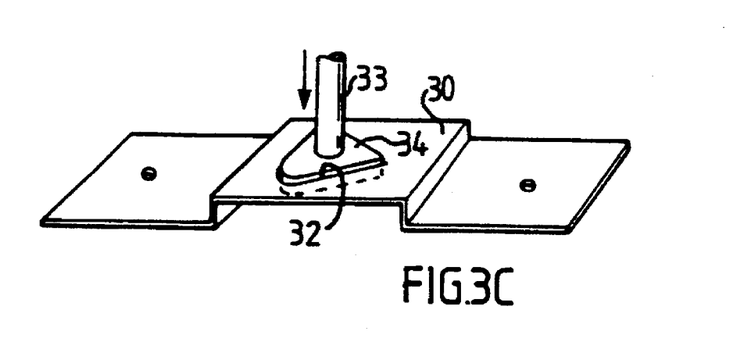
Figure 3D:
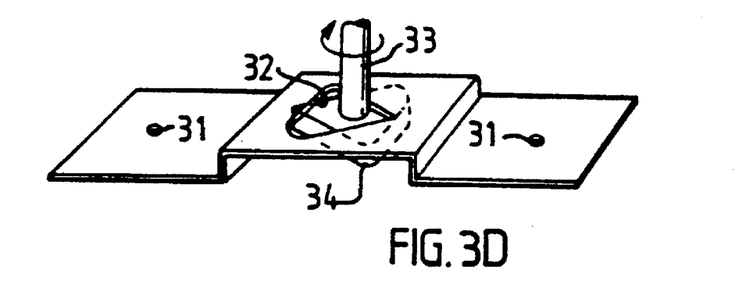

FIG. 3A illustrates a fitting 30 which is mounted on a portable computer, for instance by means of screws 31, in a manner such that part of the fitting 30 will jut out from the computer, this part having a non-circular hole 32. Shown in FIG. 3B is a lock plunger 33 having a lock head 34 on one end thereof. The shape of the lock head 34 corresponds to the shape of the hole 32, this shape being generally triangular in the illustrated embodiment. FIG. 3C shows the locking head 34 of the lock plunger 33 inserted into the hole 32 of said fitting in the direction of the arrow shown. The configuration of the hole and the lock head is such that when the lock head 34 has been placed fully in the hole, locking can be achieved by turning the lock plunger 33 (and therewith also the lock head 34) through one-half of a revolution, as illustrated in FIG. 3D.

Of course, the hole and the lock head may have different shapes, provided that the lock head is able to lock the fitting in a similar manner.

Figure 4:
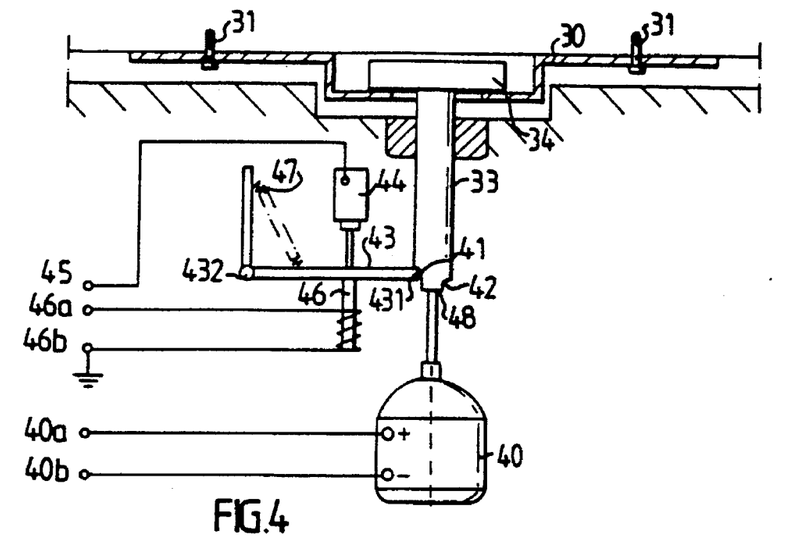
FIG. 4 is a cross-sectional view of a lock mechanism constructed in accordance with one embodiment of the present invention.

FIG. 4 illustrates a lock mechanism for locking the computer 1 firmly to the support 2. A locking mechanism of the same kind may also be used to lock the portable computer 14 in the expansion unit 11. The lock mechanism includes, among other things, a fitting 30 mounted on a computer (1 or 14), for instance fitted firmly to the computer by means of screws, and a lock plunger 33 which is rotatably secured to the security support 2 or to one of the walls of the expansion-unit insertion compartment 13.

The lock plunger 33 is controlled by an electric motor 40 which is able to rotate in both a clockwise and an anti-clockwise direction. The motor 40 is controlled by means of two signal lines 40a and 40b. Provided on the lower end 48 of the lock plunger are two recesses 41 and 42 which have flat, or planar, vertical surfaces (see also FIGS. 5A and 5B). In the operational state of the lock plunger shown in FIG. 4, one end 431 of a clapper 43 is inserted in the recess 41. This end 431 has a flat vertical surface and coacts with the flat vertical surface of the recess 41 in a manner to prevent rotation of the plunger. In order for the lock head to be able to rotate, it is necessary to remove the end 431 of the clapper from the recess. The other end 432 of the clapper is pivoted.

Figure 5A:
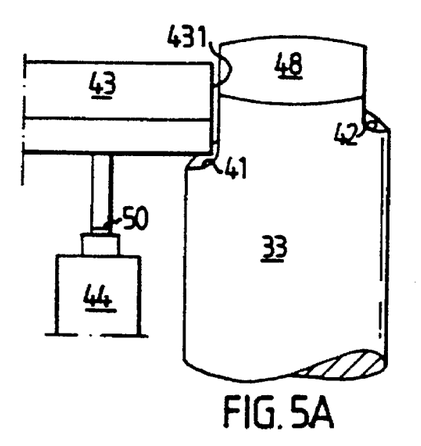
FIGS. 5A and 5B are detail views from beneath a lock plunger and show a clapper in abutment with a position sensor according to FIG. 4.
Figure 5B:
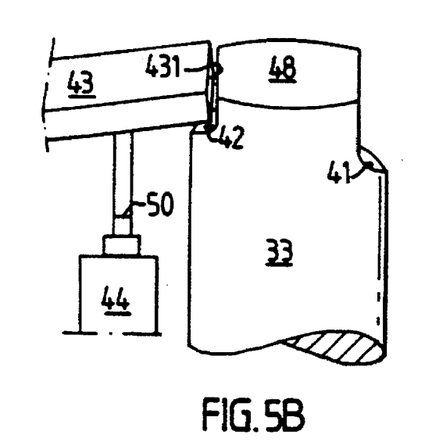

As illustrated in larger scale in FIG. 5A, when the clapper 43 is located in the recess 41, the lock head 34 of the plunger will be in a position such as to firmly lock the fitting. FIG. 5B, on the other hand, shows the lock head of the plunger, in larger scale, in a position in which the fitting can be lifted from the lock head, i.e. the lock is open, when the clapper 43 is located in the recess 42. It will be clearly seen from a position marker 50 in the two Figures that the clapper adopts two different horizontal positions, depending on in which recess, 41 or 42, the clapper is located.

A position sensor 44 senses the horizontal position of the clapper 43 and transmits, over a signal line 45, a state signal T which informs whether the lock is closed or open. The horizontal position of the clapper is dependent on in which recess the end 431 of the clapper is located, since these recesses have different depths. Alternatively, it is conceivable for one recess to be electrically conductive and the other recess electrically non-conductive, and that electrical contact occurs between the clapper and the lock plunger in one case but not in the other.

In order to lock or unlock the lock mechanism, it is necessary for the clapper to move downwards, the motor to rotate the lock plunger through half a revolution, and for the clapper to be moved upwards so as to be located in the opposing recess. This up and down movement of the clapper is effected with the aid of a solenoid arrangement 46 in combination with a spring 47. The solenoid arrangement is mounted on the clapper and when a voltage is applied to the solenoid, the clapper 43 is forced downwards. In the absence of voltage, the clapper is subjected only to the upwardly directed force of the spring 47. A voltage can be applied to the solenoid through the signal lines 46a and 46b, one of which may be connected to earth.

Figure 6:
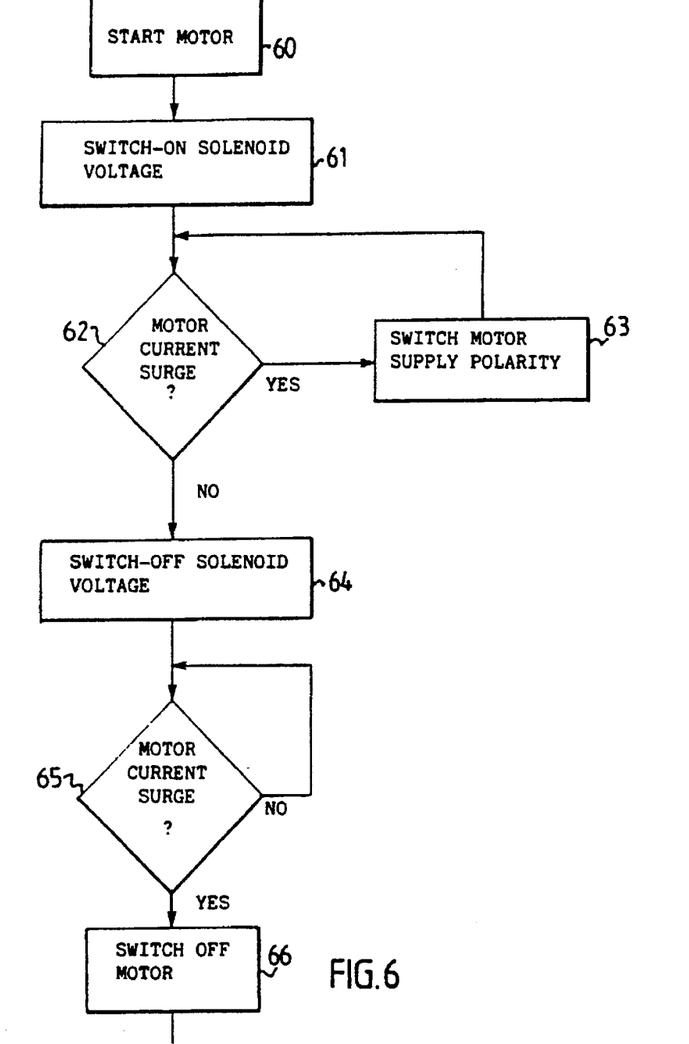
FIG. 6 is a flow chart illustrating the preferred steps of a method by means of which locking and unlocking of a lock mechanism according to FIG. 4 is effected.

A method for effecting locking/unlocking of the lock mechanism shown in FIG. 4 will now be described with reference to the flow chart of FIG. 6. The method is the same for both locking and unlocking of the lock mechanism. This is because the procedure for locking the mechanism is the same as the procedure for unlocking the mechanism, i.e.

rotation of the lock plunger through one-half of a revolution. The procedure is initiated by a computer-delivered control signal S which informs the drive electronic of the lock mechanism that the operational state of the lock shall be changed from a locked to an unlocked state or from an unlocked to a locked state.

The drive electronic starts the motor in step 60 and applies a voltage on the solenoid 46 in step 61. Before being lifted from the recess in which it is located, the clapper prevents the lock plunger, and therewith the motor shaft, from rotating, which results in a surge of motor current. Each time a motor current surge is detected in step 62, the polarity of the motor supply is shifted in step 63, which causes the motor to strive to rotate in the other direction. It may be necessary to include a delay in step 62 or step 63, so that the motor will have time to react. The clapper is moved downwards and out of the recess, by the downwardly acting force that is applied by the solenoid to the clapper. Downward movement of the clapper is facilitated because the friction between the vertical surface of the clapper end 431 and the vertical surface of one of the recesses 41 or 42 is minimized by the motor rotating the lock plunger slightly forwards and backwards. When the clapper is fully removed, the motor is able to rotate and there is no longer a surge of motor current. Subsequent to a given lapse of time, the solenoid voltage in step 64 is broken and the clapper falls down onto a lower surface 48 on the lock plunger, i.e. is not engaged in any recess due to the motor having rotated the lock plunger slightly. After the motor has rotated the lock plunger through half a revolution, either clockwise or anti-clockwise, the clapper falls into place in the opposing recess, aided by the force of said spring. In step 65, there is awaited a motor current surge that will indicate that the clapper is in position and thus prevent the motor from rotating the lock plunger. The motor is switched-off in step 66. The operational state of the lock has been changed. The computer and the lock-control program stored therein is informed by the state signal T of the state in which the lock mechanism is now found, through the intermediary of the position sensor and the drive electronic.

Figure 7:
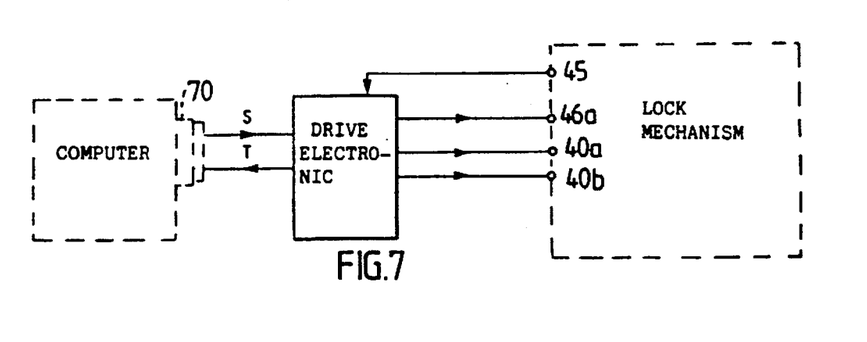
FIG. 7 is a block schematic of the drive electronics of a lock mechanism illustrated in FIG. 4.

FIG. 7 is a block diagram illustrating the drive electronic of the lock mechanism. The signal interface of the drive electronic to the computer includes an input signal to the drive electronic, the control signal S, and an output signal from the drive electronic, the state signal T. The drive electronic controls the lock mechanism by means of the signal lines 40a, 40b and 46a, i.e. by means of the current supply to the motor, and the solenoid signal. Information concerning the operational state of the lock mechanism is obtained by means of the position sensor signal on signal line 45. The physical interface 70 may be comprised of the serial or parallel port of the computer or some other available signal interface.

A second embodiment of the present invention will now be described with reference to FIGS. 8, 9 and 10.

Figure 8A:
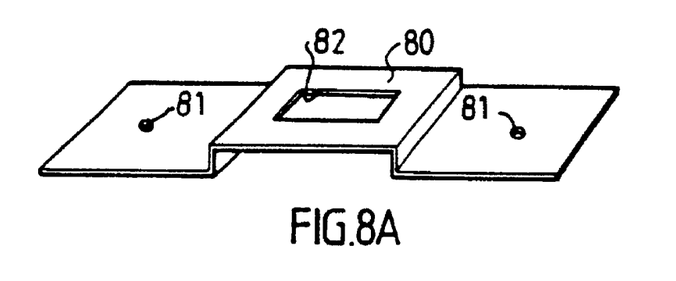
FIGS. 8A, 8B, 8C and 8D illustrate a fitting and a lock plunger intended for use in a lock mechanism constructed in accordance with a second embodiment of the present invention.
Figure 8B:
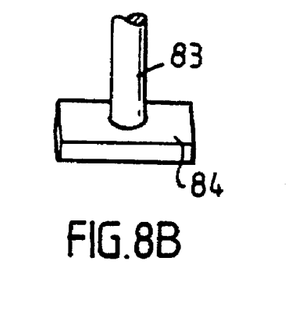
Figure 8C:
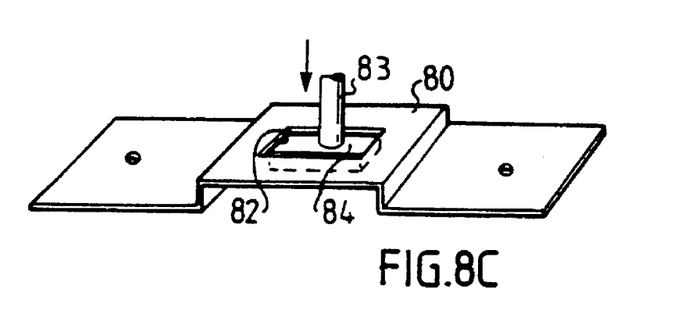
Figure 8D:
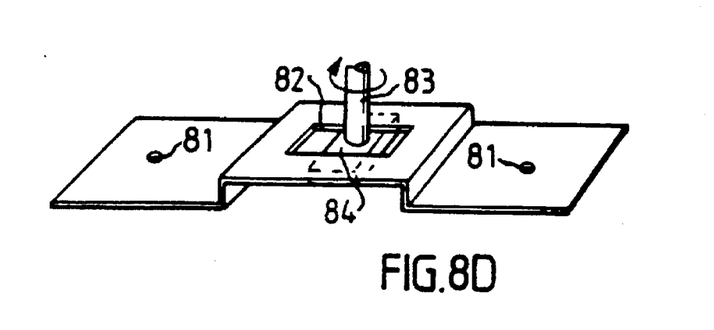

FIG. 8A illustrates a fitting 80 which is mounted on a portable computer, for instance by means of screws 81, in a manner such that part of the fitting 80, which is provided with a hole or aperture 82, juts out from the computer. FIG. 8B illustrates a lock plunger 83 having a lock head 84 on one end thereof. The shape of the lock head 84 corresponds to the shape of the hole 82 in the fitting. FIG. 8C illustrates the lock head 84 of the plunger 83 inserted in the fitting hole 82, in the direction of the arrow shown. When the lock head 84 is fully inserted, locking of the mechanism can be achieved by rotating the lock plunger 83 (and therewith also the lock head 84) through one-quarter of a revolution, as shown in FIG. 8D.

It will be understood that the hole and the lock head may have a shape different to that illustrated, provided that the lock head is able to lock the fitting in a manner similar to that described earlier.

Figure 9:
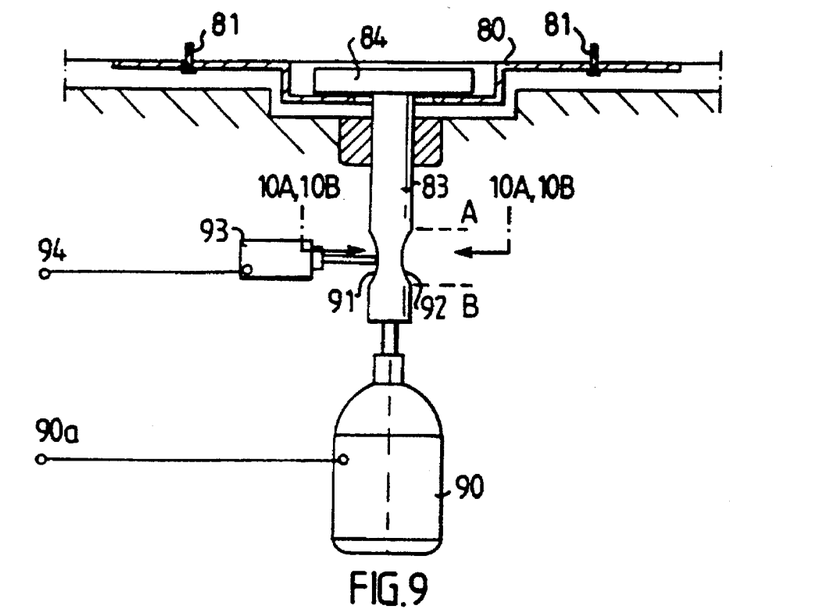
FIG. 9 is a cross-sectional view of a lock mechanism according to another embodiment of the present invention.
Figure 10A:
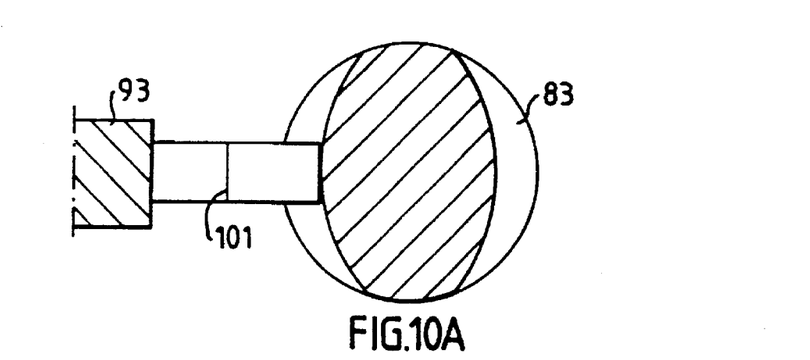
FIGS. 10A and 10B are cross-sectional views from above of a lock plunger in a locked and an unlocked state respectively, said view being taken on the line AA in FIG. 9.
Figure 10B:
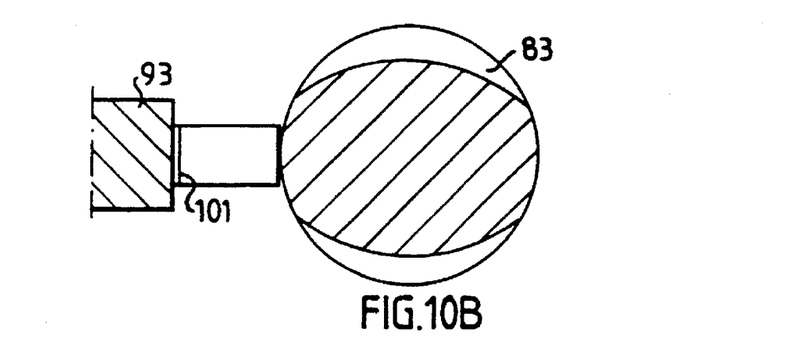

FIG. 9 illustrates a lock mechanism for locking the computer 1 firmly to a security support 2. The lock mechanism may also be used to firmly lock the portable computer 14 in the expansion unit 11. The lock mechanism includes, among other things, a fitting 80 mounted on a computer (1 or 14), for instance secured thereto by means of screws, and a lock plunger 83 which is rotatably mounted on the support element 2 or to one of the walls of the insertion compartment 13 of the expansion unit 11. The lock plunger 83 is controlled by an electric stepping motor 90 which may be rotated incrementally, or stepwise, wherein one step or increment corresponds to rotation of the lock plunger through one-quarter of a revolution. The motor 90 is controlled by means of a signal line 90a. The lock plunger has a circular cross-section with the exception of a plunger length A to B, over which the cross-section is non-circular, e.g. elliptical, this cross-sectional shape being obtained by providing the lock plunger 83 with two recesses 91 and 92 which have curving vertical surfaces. A position sensor 93 is in contact with a point located between the plunger length A-B, i.e. a point at which the plunger cross-section is non-circular.

The manner in which the position sensor operates will now be explained more clearly with reference to FIGS. 10A and 10B. FIG. 10A shows the locked state of the lock mechanism, while FIG. 10B shows the unlocked state of said mechanism. It will be clearly seen, among other things, from a position marker 101, that the position sensor adopts two mutually different positions, depending on the rotational position of the lock plunger 83. When the stepping motor rotates the lock plunger 83, and therewith the lock head 84 located in the fitting 80, through one step, i.e. through one-quarter of a revolution, the operational state of the lock mechanism will change from a locked to an unlocked state or from an unlocked state to a locked state. This state is sensed by the position sensor 93.

Figure 11A:
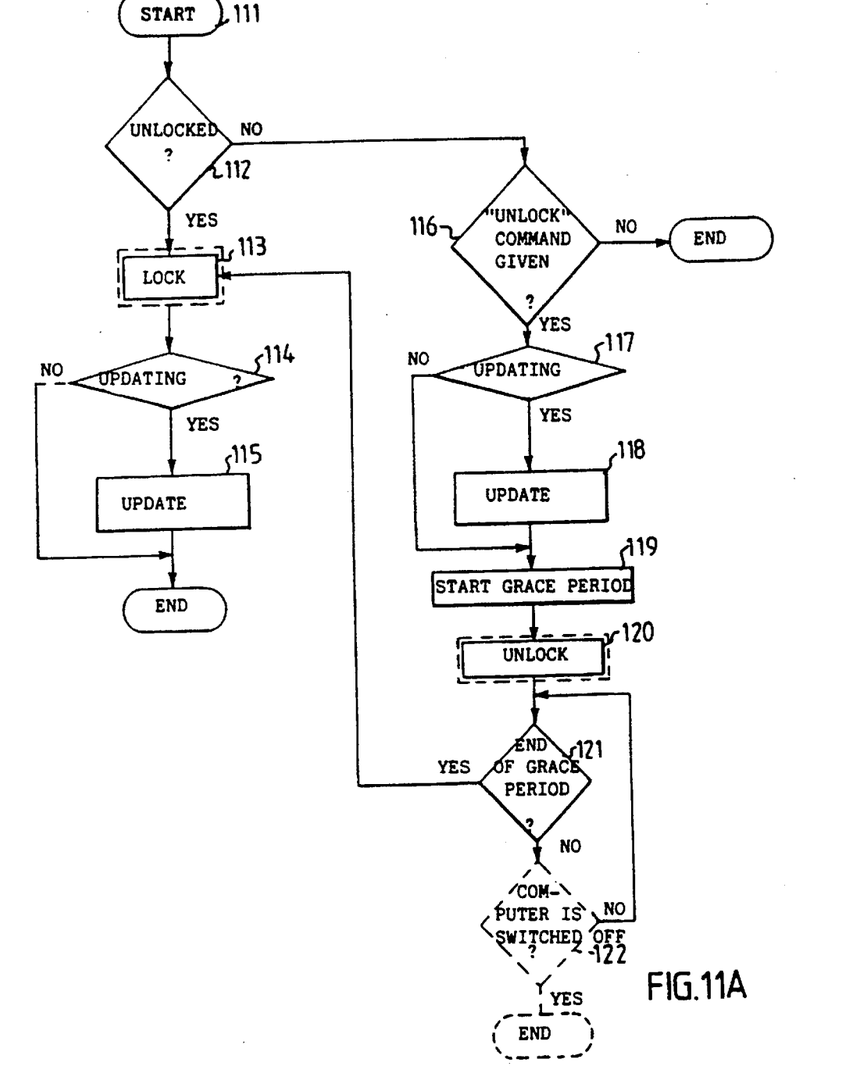
FIG. 11A is a flow chart illustrating the preferred steps of a method by means of which functioning of the lock arrangement is controlled and updating carried out.

The flow chart in FIG. 11A illustrates those method steps which are necessary for controlling a lock arrangement for portable computers. The method can be realized in several different ways, for instance as a control program in the computer (so-called device driver), a memory resident program in the computer or totally or partially in hardware. With regard to hardware realization, only those parts of the method relating to lock control are concerned, and not those which are concerned with updating. Conceptually, there is no difference between a conceivable method which is repeated again and again once having commenced and the conception of controlling the method at intervals. If the method is to be realized as a computer program, the latter method is preferred, since in this case the processor is given time to perform other processing work. By interval control handling is meant in this case that nothing takes place unless required by outside circumstances, one such outside circumstance, for instance, being an "unlock" command given by the operator.

The method commences at starting point 111, after the operator has given an "unlock" command, or the computer has been fitted mechanically with the lock mechanism which has been connected electrically and a voltage has been applied, and terminates with the computer being switched-off or locked. Once the program has been started, the program continues to a decision step 112, in which it decides whether the lock is open or closed, on the basis of the state signal T from the lock mechanism. If the lock is open, the program orders the lock to be closed, by means of the control signal S. This takes place in a step referenced 113 in the Figure. After this order has been given, the program continues to a decision step 114, in which it decides whether or not updating shall be carried out. If only one storage medium is accessible, such as in the case when the portable computer lacks a hard disk while the stationary system is equipped with a hard disk, no updating is required, of course. Another case in which updating should be avoided is the case when the portable computer is connected to a station other than the home station or stations. By home station or stations is meant those stations to which the computer is normally connected and which have an at least partially similar organization of files/list of files. The question as to whether or not a station is a home station can be decided, for instance, by giving the portable computer an identification number which is compared with a corresponding identification number of the station. When these two numbers coincide, the portable computer is connected to a home station. The circumstances are such that updating is controlled realistically when it is also desirable and under which conditions it is desirable. This can be decided automatically or by means of operator interaction. The program may have a configuring part in which updating parameters can be inserted, among other things, the extent of operator interaction. If it is decided that updating shall take place, the program continues to step 115. Otherwise, the program misses this step. Selective updating can be effected at step 115, so that the latest version of selected files/list of files will be identical on the storage medium of the portable computer and a possibly stationary storage medium. More than one stationary storage medium may be involved in the updating process.

If it is determined in decision step 112 that the lock is closed, a check is carried out in a decision step 116 as to whether an "unlock" command has been given by the operator. If no command has been given, the program is terminated. Otherwise, the program continues to decision step 117 and if it is found that updating is both realistic and desirable, updating is carried out in step 118. The function of decision step 117 and step 118 is similar to the function of decision step 114 and step 115. Alternatively, when locking the computer, the updating configuration may be different to the configuration when unlocking the computer, for instance with respect to which files/list of files shall be involved, etc.

In step 119, a grace period is started, which may be provided, for instance, by a counter which counts down to zero. The grace period may be adjustable in an optional configuration part of the program. In step 120, there is produced a control signal S which orders the lock to be opened. If the grace period started in step 119 expires, the program continues to step 113, resulting in closing of the lock. The operator is thus given a certain length of time to switch off the computer voltage and to lift out the portable computer. If something should occur during this grace period that prevents the operator from carrying out these steps, for instance a telephone call, the lock will be closed when the grace period expires. This method further increases security, insomuch that the portable computer is not allowed to remain unlocked for longer than a restricted time period. The grace period is controlled in a decision step 121. Step 122 is shown in broken lines to indicate that it is not part of the program, but symbolizes an external event which terminates the program. It is conceivable for the drive electronic of the lock mechanism to include a counter which is set from the program in step 119. This counter may also conceivably continue counting down after the computer voltage has been switched off, and when it reaches zero produce those signals which are required to close the lock. In this case, the lock mechanism must be provided with means which detect whether or not the computer has been lifted away, since the countdown of the counter must be interrupted when the computer is lifted away. In this way, no grace period monitoring is lost because the computer voltage is switched off.

Figure 11B:
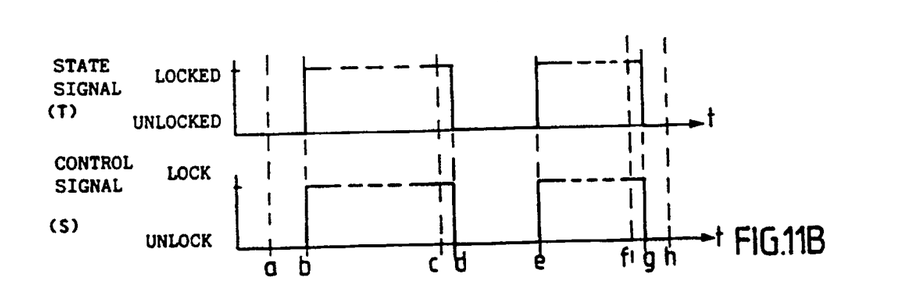
FIG. 11B illustrates two signals used in the communication between a lock mechanism and a lock control program.

FIG. 11B shows the course followed by two signals in time. The upper signal, the state signal T, indicates the operational state of the lock. The bottom signal, the control signal S, controls the operational state of the lock arrangement. The lock has two operational states, a locked state and an unlocked state. The points a to h represent different happenings in time. Point a represents the time at which the portable computer is physically fitted with the lock arrangement. The computer voltage is switched on at point b, wherein the control signal indicates that the lock shall be closed, whereafter the lock is closed and the state signal passes from unlocked to locked. An "unlock" command is given at point c, and at point d, the selectable updating process is carried out and the lock is opened, while commencing the grace period at the same time. The grace period has expired at point e, i.e. the operator has switched off the voltage and lifted away the portable computer, and the lock is re-closed. At point f, an "unlock" command is again given, the updating process is finished at the time represented by the time point g. Finally, prior to expiration of the grace period, the computer voltage is switched off and the computer lifted from the lock arrangement. This takes place at the time represented by time point h.

I claim:

1. A device, for securely locking a removable computer to a unit, comprising a lock mechanism which is readily manoeuvrable between a locked and an unlocked state, wherein the lock mechanism includes a member which is rotatable by an electric motor between positions corresponding to said locked and unlocked states in response to electrical control signals, wherein the computer is provided with an electrical outlet which is connectable to the lock mechanism, wherein the computer includes a program, for controlling the operation of the lock mechanism and generating the electrical control signals, such that when the computer is required to be locked to the unit, the member is rotated by the electric motor into the locked state and such that when the computer is locked to the unit and it is required to be removed from the unit, the member is rotated by the electric motor, wherein the lock mechanism is functional temporarily both when fitting the computer to and removing the computer from said unit, and wherein the lock mechanism program also includes a program for automatically updating selected data when the lock mechanism program is in function.

2. A device according to claim 1, wherein the lock mechanism is adapted to automatically be manoeuvred to the locked state and to lock the computer to the unit when the computer is placed in position and adapted to normally hold the computer firmly locked to the unit.

3. A device according to claim 1, wherein the computer electrical outlet is connectable to the lock mechanism through the intermediary of an interface through which control signals can be transmitted from the computer to the lock mechanism and state signals can be transmitted from the lock mechanism to the computer.

4. A device according to claim 3, wherein the interface is comprised of a serial or parallel computer port.

5. A device according to claim 1, wherein the lock mechanism is adapted to be manoeuvred to the unlocked state in response to a call from the lock mechanism program and subsequent delivery to the computer of a predetermined code word or the like.

6. A device according to claim 1, wherein when the lock mechanism is connected to the computer by the lock mechanism program, the lock mechanism is adapted to be held in the unlocked state for a predetermined length of time after an adequate request for the mechanism to be manoeuvred to the unlocked state, and is otherwise adapted to be held in the locked state.

7. A device according to claim 1, and including a second lock mechanism which functions to maintain the computer firmly locked to the unit when a voltage is applied to the computer, thereby preventing the computer from being removed from the unit until the first lock mechanism has first been manoeuvred to the unlocked state with the aid of the computer program and the voltage to the computer has thereafter been switched off.

8. A device according to claim 1, wherein a controllable part of the lock mechanism is placed in the unit; and wherein the electrical computer outlet is connectable to the unit.

9. A device according to claim 1, wherein an electrically controllable part of the lock mechanism is housed in the unit, which unit is the unit of a computer system which normally includes a control processor, a memory and a hard disk.

10. A device according to claim 1, wherein the lock mechanism includes a fitting, and the rotatable member is a rotatable lock plunger which, when in a first position, can be inserted in the fitting through a non-circular opening having a shape which corresponds to the shape of a head of the lock plunger, and which, when in a second position, is locked to the fitting, and wherein the motor rotates the lock plunger clockwise or anti-clockwise so as to move the lock plunger to said first or to said second position.

11. A device according to claim 10, wherein the lock plunger is provided with a first and a second recess, wherein the lock mechanism also includes a clapper element, which when located in one of said first and second recesses will prevent rotation of the lock plunger, and a solenoid arrangement for allowing the lock plunger to rotate to the first or the second position as a result of movement of the clapper out of the one recess.

12. A device according to claim 11, wherein the first and the second recess of the lock plunger have mutually different depths; and wherein a position sensor functions to detect the horizontal position of the clapper element and is therewith able to indicate, by means of an output signal, in which recess the clapper element is located and also the operational state of the lock mechanism.

13. A device according to claim 11, wherein one recess of the lock plunger conducts electricity and wherein an electric contact is established between the clapper element and the lock plunger in the one case but not in the other, and wherein an electric signal is able to indicate the operational state of the lock mechanism.

14. A device according to claim 10, wherein the motor is a stepping motor.

15. A device according to claim 14, wherein the lock plunger has two recesses having curving vertical surfaces such that the lock plunger has a non-cylindrical cross-section over a part of its length, wherein a position sensor in contact with the lock plunger at said part functions to produce different output signals depending on how the lock plunger is rotated, the operational state of the lock mechanism changing from a locked state to an unlocked state or vice versa when the stepping motor rotates the lock plunger, and therewith the lock head, in the fitting through one-quarter of a revolution.

16. A device for securely locking a computer to a unit, comprising a lock mechanism which is readily manoeuvrable between a locked and an unlocked state, wherein the lock mechanism includes a member which is rotatable by an electric motor between positions corresponding to said locked and unlocked states in response to electrical control signals, wherein the computer is provided with an electrical outlet which is connectable to the lock mechanism, wherein the computer includes a program, for controlling the operation of the lock mechanism and generating the electrical control signals, such that when the computer is required to be locked to the unit, the member is rotated by the electric motor into the locked state and such that when the computer is locked to the unit and it is required to be moved from the unit, the member is rotated by the electric motor to the unlocked state, wherein the lock mechanism includes a fitting, and the rotatable member is a rotatable lock plunger which, when in a first position, can be inserted in the fitting through a non-circular opening having a shape which corresponds to the shape of a head of the lock plunger, and which, when in a second position, is locked to the fitting, wherein the motor rotates the lock plunger clockwise or anti-clockwise so as to move the lock plunger to said first or said second position, wherein the lock plunger is provided with a first and a second recess, wherein the lock mechanism also includes a clapper element, which when located in one of said first and second recesses will prevent rotation of the lock plunger, and a solenoid arrangement for allowing the lock plunger to rotate to the first or the second position as a result of movement of the clapper out of the one recess, and wherein the first and the second recess of the lock plunger have mutually different depths; and wherein a position sensor functions to detect the horizontal position of the clapper element and is therewith able to indicate by means of an output signal, in which recess the clapper element is locked and also the operational state of the lock mechanism.

17. A device for securely locking a computer to a unit, comprising a lock mechanism which is readily manoeuvrable between a locked and an unlocked state, wherein the lock mechanism includes a member which is rotatable by an electric motor between positions corresponding to said locked and unlocked states in response to electrical control signals, wherein the computer is provided with an electrical outlet which is connectable to the lock mechanism, wherein the computer includes a program, for controlling the operation of the lock mechanism and generating the electrical control signals, such that when the computer is required to be locked to the unit, the member is rotated by the electric rector into the locked state and such that when the computer is locked to the unit and it is required to be moved from the unit, the member is rotated by the electric motor to the unlocked state, wherein the lock mechanism includes a fitting, and the rotatable member is a rotatable lock plunger which, when in a first position, can be inserted in the fitting through a non-circular opening having a shape which corresponds to the shape of a head of the lock plunger, and which, when in a second position, is locked to the fitting, wherein the motor rotates the lock plunger clockwise or anti-clockwise so as to move the lock plunger to said first or said second position, wherein the lock plunger is provided with a first and a second recess, wherein the lock mechanism also includes a clapper element, which when located in one of said first and second recesses will prevent rotation of the lock plunger, and a solenoid arrangement for allowing the lock plunger to rotate to the first or the second position as a result of movement of the clapper out of the one recess, and wherein one recess of the lock plunger conducts electricity and wherein an electric contact is established between the clapper element and the lock plunger in the one case but not in the other, and wherein an electric signal is able to indicate the operational state of the lock mechanism.

18. A device for securely looking a computer to a unit, comprising a lock mechanism which is readily manoeuvrable between a locked and an unlocked state, wherein the lock mechanism includes a member which is rotatable by an electric motor between positions corresponding to said locked and unlocked states in response to electrical control signals, wherein the computer is provided with an electrical outlet which is connectable to the lock mechanism, wherein the computer includes a program, for controlling the operation of the lock mechanism and generating the electrical control signals, such that when the computer is required to be locked to the unit, the member is rotated by the electric motor into the locked state and such that when the computer is locked to the unit and it is required to be moved from the unit, the member is rotated by the electric motor to the unlocked state, wherein the lock mechanism includes a fitting, and the rotatable member is a rotatable lock plunger which, when in a first position, can be inserted in the fitting through a non-circular opening having a shape which corresponds to the shape of a head of the lock plunger, and which, when in a second position, is locked to the fitting, wherein the motor rotates the lock plunger clockwise or anti-clockwise so as to move the lock plunger to said first or said second position, wherein the motor is a stepping motor, wherein the lock plunger has two recess having curving vertical surfaces such that the lock plunger has a non-cylindrical cross-section over a part of its length, wherein a position sensor in contact with the lock plunger at said part functions to produce different output signals depending on how the lock plunger is rotated, the operational state of the lock mechanism changing from a locked state to an unlocked state or vice versa when the stepping motor rotates the lock plunger, and therewith the lock head, in the fitting through one quarter of a revolution.

* * * * *